(12) United States Patent
Berger

(10) Patent No.: US 10,538,396 B2
(45) Date of Patent: Jan. 21, 2020

(54) COMPACT ALIGNMENT OF A FLOW

(71) Applicant: SIDEL ENGINEERING & CONVEYING SOLUTIONS, Reichstett (FR)

(72) Inventor: Julien Berger, Reichstett (FR)

(73) Assignee: SIDEL ENGINEERING & CONVEYING SOLUTIONS, Reichstett (FR)

( * ) Notice: Subject to any disclaimer, the term of this patent is extended or adjusted under 35 U.S.C. 154(b) by 0 days.

(21) Appl. No.: 15/755,905

(22) PCT Filed: Aug. 11, 2016

(86) PCT No.: PCT/FR2016/052070
§ 371 (c)(1),
(2) Date: Feb. 27, 2018

(87) PCT Pub. No.: WO2017/032942
PCT Pub. Date: Mar. 2, 2017

(65) Prior Publication Data
US 2019/0031449 A1 Jan. 31, 2019

(30) Foreign Application Priority Data
Aug. 27, 2015 (FR) ...................... 15 57963

(51) Int. Cl.
*B65G 47/72* (2006.01)
*B65G 47/68* (2006.01)

(52) U.S. Cl.
CPC ................. *B65G 47/683* (2013.01)

(58) Field of Classification Search
None
See application file for complete search history.

(56) References Cited

U.S. PATENT DOCUMENTS

| 3,109,529 A | 11/1963 | Carter |
| 3,866,739 A | 2/1975 | Sikorski |
| 3,934,706 A | 1/1976 | Tice |

(Continued)

FOREIGN PATENT DOCUMENTS

| CH | 605 353 A5 | 9/1978 |
| DE | 24 32 337 A1 | 1/1975 |

(Continued)

OTHER PUBLICATIONS

International Search Report, dated Nov. 25, 2016, from corresponding PCT application No. PCT/FR2016/052070.

*Primary Examiner* — Kavel Singh

(57) ABSTRACT

Disclosed is a conveyor device for conveying along a conveyor plane, in order to transform a wide flow of products into a downstream single-file flow, including an intake conveyor, suitable for conveying the wide flow, an output conveyor suitable for conveying the single-file flow, an acceleration conveyor positioned between the intake conveyor and the outlet conveyor and including a plurality of conveyor units with a speed gradient, and also including a guide for guiding the products transversely from the intake conveyor to the outlet conveyor and positioned downstream from the flow of products so that the products are moved against same under the effect of the consecutive conveyors. Also disclosed is a corresponding method.

18 Claims, 2 Drawing Sheets

(56) References Cited

U.S. PATENT DOCUMENTS

| | | | |
|---|---|---|---|
| 4,489,820 A | 12/1984 | Schneider | |
| 6,328,151 B1 | 12/2001 | Spangenberg et al. | |
| 7,147,098 B2 * | 12/2006 | Ledingham | B65G 21/2054 198/453 |
| 8,196,733 B2 * | 6/2012 | Hahn | B65G 47/71 198/347.4 |
| 8,534,451 B2 * | 9/2013 | Damen | B65G 47/682 198/347.4 |
| 2013/0113438 A1 | 5/2013 | Aradachi et al. | |

FOREIGN PATENT DOCUMENTS

| | | |
|---|---|---|
| EP | 0 252 461 A1 | 1/1988 |
| EP | 0 319 875 A2 | 6/1989 |
| FR | 2 981 874 A1 | 5/2013 |

\* cited by examiner

COMPACT ALIGNMENT OF A FLOW

This invention pertains to the field of the conveying of products within an industrial line for processing products of the flask, bottle, can type, etc., and it has as its object, on the one hand, a particular conveyor device with an aligner function, and, on the other hand, a method that uses this device.

In this field, U.S. Pat. No. 3,866,739 discloses, for example, a device of the aligner type where products come in with an uncontrolled configuration, in particular in multiple products beside one another, and exit in a single column of products. The downstream guide is driven by a regular motion whose object is to promote shifting toward a single-file flow.

FR2981874 discloses an aligner where the products enter in multiple columns that are parallel to one another and exit in a single column. The products pass through an acceleration zone, which separates the intake conveyor and the outlet conveyor, where the conveyors are parallel. The acceleration zone comprises a number of parallel chains, with the speed of the chains being higher overall close to the outlet conveyor. The arrangement in a unidirectional flow is facilitated by the fact that certain chains have speeds that are different from a continuous speed increase scheme from the intake conveyor up to the outlet conveyor.

In the embodiments that are disclosed in this document, as well as in U.S. Pat. No. 6,328,151, for example, a single guide is provided in the acceleration zone, in order to form a delimitation of the downstream flow. This guide is oriented through the acceleration zone in such a way as to offset transversely the products from the intake conveyor up to the outlet conveyor. A receiving tray is provided against the single-file outlet conveyor, which makes it possible to collect the products that have fallen there. A linear counter-guide is then mounted opposite the guide in the single-file conveyor zone.

U.S. Pat. No. 4,489,820 discloses a different principle, in which the guide in the acceleration zone forms the upstream edge, with the products being brought against it by gravity, taking into account the slope of the plane in which the products travel. Such a principle is difficult to carry out, however, taking into account the slope to be created, and it causes products to fall.

Finally, U.S. Pat. No. 3,109,529 discloses an aligner principle where the products, organized into wide flows of several front units, pass through a convergent portion that is oriented toward the outlet conveyor, moving faster. However, the acceleration zone is only formed here by a single conveyor, which limits the ratio between outlet speed and intake speed, or, in other words, between the size of the intake flow and the size of the outlet flow, since the shifting between two successive speeds can be done only with an acceleration that does not cause the products to fall. In addition, despite the thin elastic strips of the inner sides of the walls of the convergent portion, the products remain contained between two rigid walls, against which they come directly as soon as the difference in speed between the intake and the outlet has the effect of densifying the flow until the products crush the thin spring strips. Such an embodiment therefore limits the ratio between the size of the flow at the intake and the size of the flow at the outlet and can create wedging points in this bottleneck.

Thus, the constant performance criteria of the aligner devices of this type are, among others, reliability, the occurrence of wedging points in a convergence portion, the ratio of reduction between the flow at the intake and the flow at the outlet, and, conversely, the ratio of increase between the speed at the intake and the speed at the outlet, as well as the size of the equipment.

In particular, it is understood that with the embodiments described above, shifting from a low speed to a high speed is all the more likely to result in products dropping as occurs over a shorter distance. In the embodiments of the state of the art, reliability therefore requires a significant and detrimental longitudinal footing.

In this context, the object of the invention is thus in particular to propose an aligner-type conveyor device that is compact and therefore reliable in order to obtain, over a shorter distance, a single-file flow of products from a wider flow.

To do this, the invention proposes equipping the device, in the acceleration portion, with a flexible counter-guide, delimiting the flow of products from the upstream side, then exerting, if necessary, a slight pressure on the products to contribute to bringing them against the stationary guide opposite and thus to complete the alignment.

The invention thus has as its object a conveyor device in a conveyor plane, for transforming a wide flow of products into a downstream single-file flow, comprising an intake conveyor, adapted to convey the wide flow, an outlet conveyor that is adapted to convey the single-file flow, an acceleration conveyor, positioned between the intake conveyor and the outlet conveyor and having a number of conveyor units with a speed gradient, with said device also comprising a guide, for bringing the products of the intake conveyor transversely to the outlet conveyor and positioned downstream from the flow of products in such a way that the products are brought against it under the action of the successive conveyors.

This device is characterized in that it also comprises a flexible counter-guide, placed essentially opposite the guide in the area of the acceleration conveyor and forming with said guide a convergent guide portion that is oriented toward the outlet conveyor.

The invention also has as its object a method implemented by this device, namely a method for conveying products in a conveyor plane, during which the products, by passing through an acceleration conveyor, shift from a wide flow in an intake conveyor to a single-file flow in an outlet conveyor.

This method is characterized in that the products travel in the acceleration conveyor between a stationary guide, downstream, and a flexible counter-guide, upstream, which together form a convergent portion toward the outlet conveyor.

The invention will be better understood using the description below, which is based on possible embodiments, explained in a way that is illustrative and in no way limiting, with reference to the accompanying figures, in which.

Figure 1:
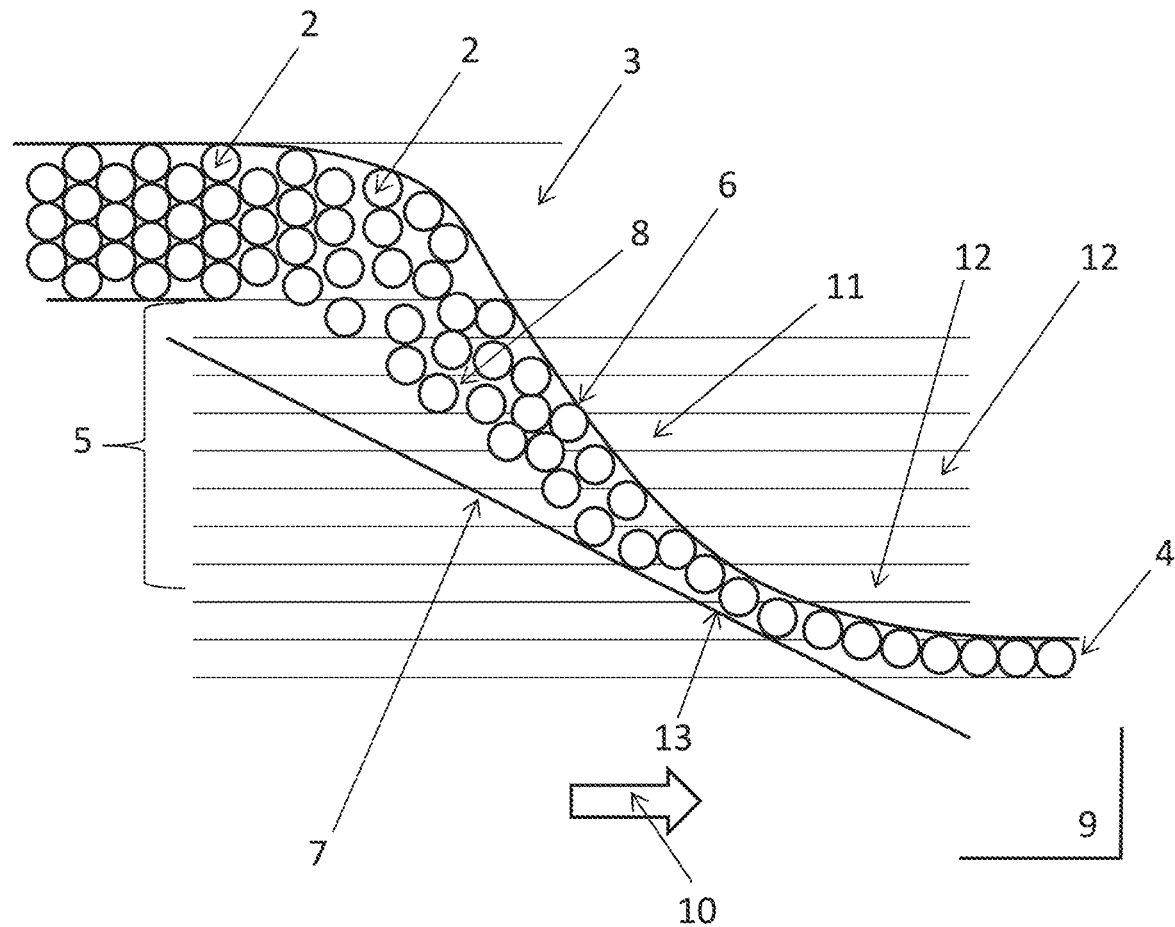
FIG. 1 shows an aligner structure scheme according to the invention.

The invention therefore first of all has as its object a conveyor device 1 in a conveyor plane 9 for transforming a wide flow of products 2 into a downstream single-file flow, comprising an intake conveyor 3 that is adapted for conveying the wide flow, an outlet conveyor 4 that is adapted for conveying the single-file flow, an acceleration conveyor 5 that is positioned between the intake conveyor 3 and the outlet conveyor 4 and having a number of conveyor units 12 with a speed gradient, with said device also comprising a guide 6, for bringing the products 2 of the intake conveyor 3 transversely to the outlet conveyor 4 and positioned downstream from the flow of products 2 in such a way that the products 2 are brought against it under the action of successive conveyors.

Such a device 1 thus makes it possible in particular to reduce the width of a flow of products 2 that are conveyed in an industrial line, i.e., its dimension that is transverse to its movement of advance. As will be described later, in particular with reference to FIG. 2, the device 1 can also comprise an accumulation table that is upstream from the reduction of flow width that ensures the aligner function itself.

At the outlet of the device 1, the products 2 therefore preferably travel in the form of a single column. Upstream from this phase, the flow is wider and is thus delimited on both sides by guides that are separated by a distance that is greater than the size of a product 2. Such a wide flow therefore has a larger width before the alignment than after, which can correspond to the shifting of a wide flow of a width of several front products 2 to a width of a single front product.

The products 2 preferably have a circular base that is mounted on the drive surface, with their size then corresponding to one diameter that is taken into account. It will also be noted that a flow of products 2 with a circular base can be such that the products 2 are interlocked in staggered rows, with the number of front products 2 in the flow then corresponding to the largest number of front products 2. Actually, the number of front products 2 in a staggered flow varies by one unit at each front.

At the intake of the alignment itself, the intake conveyor 3 therefore has guides that are far enough away from one another so that a wide flow can develop between them, in particular a flow of at least two products 2. At the outlet of the alignment, the products 2 are kept between two guides that only allow a single front product 2 to pass. In conventional embodiments, the outlet conveyor 4 at the beginning nevertheless often has only a single guide against which the single-file flow of products 2 travels, with the other side being free to make possible the release in particular of the recumbent products 2.

With the width of the flow being decreased from the intake conveyor 3 up to the outlet conveyor 4, it is understood that the speed of the products 2 is accelerated in a corresponding way. To do this, an acceleration conveyor 5 is placed between the intake conveyor 3 and the outlet conveyor 4 and receives the products 2 from the intake conveyor 3 to bring them to the outlet conveyor 4. The acceleration conveyor 5 increases the speed of the products 2 as they transversely approach the outlet conveyor 4. The speed gradient in the area of the acceleration conveyor 5, transversely to the direction of movement, generally makes it possible to stretch out the flow of products 2 and relatively easily reach a flow with a maximum of several front products or simply two front products 2.

The speed of the acceleration conveyor 5, greater overall than the speed of the intake conveyor 4, makes it possible for it to bring the flow of products 2 against the guide 6, which then delimits the downstream edge, with the guide 6 extending at least partially transversely to the conveying direction 10 followed by the acceleration conveyor 5 and in the direction of the outlet conveyor 4.

According to the invention, the conveyor device 1 comprises, in addition, a flexible counter-guide 7, essentially placed opposite the guide 6 in the area of the acceleration conveyor 5 and forming with said guide 6 a convergent guide portion 8 that is oriented toward the outlet conveyor 4, with the counter-guide 7 extending in particular in a rectilinear way between two attachment points. As will be described, the counter-guide 7 is flexible enough not to exert significant pressure on the flow of products 2 in the direction of the guide 6 and then able to create wedging points. In the free position, the counter-guide 7 thus extends essentially linearly between two anchoring points. After stretching out the flow and therefore the reduction of its width, caused by the acceleration conveyor 5, the counter-guide 7 intervenes to destabilize the arrangement of the flow where two products 2 also advance beside one another, whereas a single-file flow is expected on the outlet conveyor 4.

The guide 6 passes through the acceleration conveyor 5 from the intake conveyor 3 up to the outlet conveyor 4, with, overall, a certain angle in relation to the conveying direction 10. The counter-guide 7 then itself also passes through the acceleration conveyor 5 from the intake conveyor 3 to the outlet conveyor 4, but with a less oblique direction. A convergent portion 8 therefore forms between the guide 6 and the counter-guide 7, of which one end, or restriction zone 13, is in the area of the acceleration conveyor 5.

The relative positioning and the respective shape of the guide 6 and counter-guide 7 are such that the counter-guide 7 normally comes into contact with a flow of products 2 with a width that is significantly more than a single front product 2 at the end of the convergent portion 8. Thus, in normal operation, only the flow of products 2 that is in the area of the restriction zone 13 comes against the counter-guide 7 if it has a width of more than one product 2. Upstream, the reduction of the width of the flow is essentially the result of the arrangement of the speeds of the acceleration conveyor 5, and the counter-guide 7 is far enough away that it does not interfere with the beginning of the convergent portion 8.

According to a possible additional characteristic, the counter-guide 7 is deformable by winding around an axis that is perpendicular to the conveyor plane 9, by assuming the shape in particular of a chain with links that are connected to one another in parallel with said axis. Thus, seen from above, the counter-guide 7 can bend, and, owing to its low tension in its free rectilinear configuration between two mounting points, it can curve and deform slightly. During operation, the distance between the guide 6 and the counter-guide 7 can therefore vary slightly based on the configuration of the flow of products 2.

The embodiment of the counter-guide 7 in the form of a chain with links mounted with pivots perpendicular to the conveyor plane 9 makes it possible to combine the required flexibility for modifying the contour assumed by the counter-guide 7 in the conveyor plane 9, while imparting to it the mechanical strength that is necessary in the other directions.

According to another possible additional characteristic, the intake conveyor 3, the acceleration conveyor 5, and the outlet conveyor 4 are parallel to one another and extend in a conveying direction 10, in the conveyor plane 9, with the orientation of the counter-guide 7 having a component that is transverse to the conveying direction 10 toward the outlet conveyor 4. The counter-guide 7 therefore approaches the outlet conveyor 4 transversely to the conveying direction 10, as it advances in said direction. The intake conveyor 3, acceleration conveyor 5 and outlet conveyor 4 are therefore beside one another, perpendicularly to the conveying direction 10. During their movement, the products 2, guided by the guide 6, move to gradually leave the intake conveyor 3 transversely, then to pass through the acceleration conveyor 5 transversely and then to come to the outlet conveyor 4.

In certain embodiments, the guide 6 passes through the acceleration conveyor 5 with an upstream portion 11 and then a downstream portion 12, with the first having overall, in relation to the conveying direction 10, a larger angle than the second. The guide 6 nevertheless preferably has the necessary flare-out between the two portions 11, 12. In addition, the upstream portion 11 and/or the downstream portion 12 can be curved. The guide 6 thus has two different zones: with a similar routing in the conveying direction 10, the upstream portion 11 allows a larger width to pass through transversely in said direction than the downstream portion 12.

The fact that the guide 6 is, in the upstream portion 11, opposite to the longitudinal advance of the products 2 in a significant way brings the flow of products 2 to be refined relatively quickly into the acceleration conveyor 5 and therefore without requiring an opposite pressure of mechanical contact bringing the products 2 toward the guide 6. The embodiment of the guide 6 in two portions brings about a better stability of the products 2.

According to a possible additional characteristic, the counter-guide 7 is provided, on its inner contact face with the products 2, with rollers that are free in rotation to facilitate the travel of products 2 against it, with the guide 6 being in particular also provided with such rollers. The role of these rollers is to rotate around an axis that is perpendicular to the conveyor plane 9. They thus reduce the friction in the event of contact by products 2 and can therefore be provided in the area of the inner face of the guide 6 and/or the inner face of the counter-guide 7.

Figure 2:
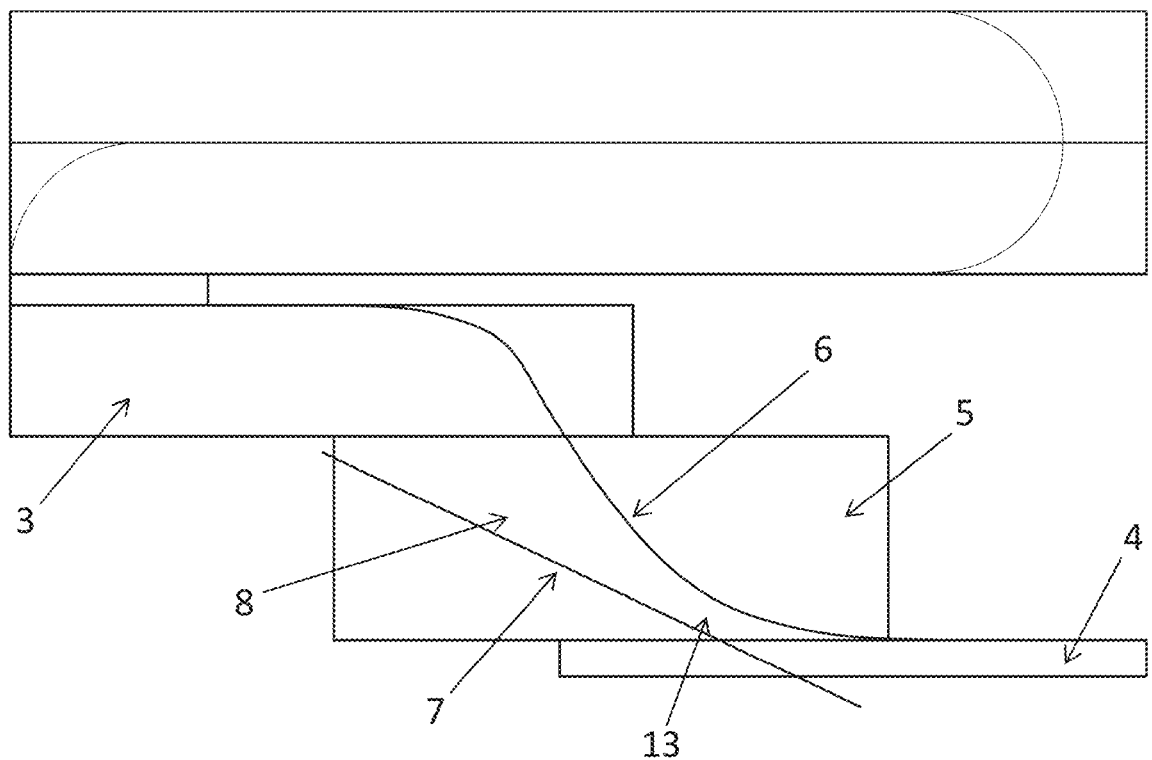
FIG. 2 shows a conveyor device according to the invention that comprises, in addition, an upstream accumulation table.

In particular embodiments, the conveyor device comprises an accumulation table that is mounted upstream from the intake conveyor 3, and whose outlet is brought directly into the intake conveyor 3. Such an accumulation table, as illustrated in FIG. 2, has at its intake as at its outlet, a wide flow of products 2, i.e., a flow that is not simply single-file. The products 2 are received on a path whose length varies based on the quantity of products 2 that are supplied upstream and accepted at the outlet.

The regulation during operation of the intake conveyor 3, the accumulation conveyor 5 and the outlet conveyor 4 is preferably coordinated with the regulation of the operation of the accumulation table. A compact module that can accept a wide flow of products 2 and can create a single-file flow and that tolerates discontinuities at the intake and/or at the outlet is thus obtained.

The invention also has as its object a method using the device as described above, namely a method for conveying products 2 in a conveyor plane 9, during which the products 2, by passing through an acceleration conveyor 5, switch from a wide flow in an intake conveyor 3 to a single-file flow in an outlet conveyor 4. The three conveyors are parallel and contribute to accelerating the products 2 in such a way as to reduce the width of the flow, preferably up to a flow of a single column.

According to the invention, the products 2 travel on the acceleration conveyor 5 between a stationary guide 6, downstream, and a flexible counter-guide 7, upstream, which together form a convergent portion 8 toward the outlet conveyor 4. As was already said, it is only at the approach of the fine end of the convergent portion 8 that the counter-guide 7 can restrict the flow of products 2 to reduce its width. During normal operation, at the beginning of the convergent portion, the distance between the guide 6 and the counter-guide 7 is much larger than the size of the flow, whose width is already reduced under the action of the increase in the speed that is caused by the acceleration conveyor 5. Implementation in the form of a flexible element that is slightly stretched between two anchoring points imparts to the counter-guide 7 its simplicity and its capacity to unbalance the flow that is still too wide in such a way that, under the action of the driving by the acceleration conveyor 5, the products 2 then all come against the guide 6 forming a single-file flow.

In particular embodiments, the counter-guide 7 essentially makes it possible to drive toward the guide 6 the products 2 that are removed from it by at most the equivalent of a column of a single front product 2. Thus, during normal operation, a product 2 that is separated in relation to the guide 6, to the right of the acceleration conveyor 5, with a distance that is greater than a product 2, is driven in the direction of the guide 6 under the action of the speed of the acceleration conveyor 5. The counter-guide 7 is positioned opposite the guide 6 to complete such an alignment.

According to a possible additional characteristic, the acceleration conveyor 5 comprises a number of conveyor units 12 that extend in the conveying direction 10 and that are placed beside one another from the intake conveyor 3 up to the outlet conveyor 4, with the speed of each conveyor unit 12 being higher than that of the adjacent unit 12 in the direction of the intake conveyor 3. The speed of the units 12 therefore uniformly increases between the intake conveyor 3 and the outlet conveyor 4.

Finally, according to another possible additional characteristic, the smaller section of the convergent portion 8 forms a restriction zone 13 that represents in size between one and two widths of product 2 and that is in particular separated from the attachment points of the counter-guide 7. This restriction zone 13 has, for example, a size that is the width of one product 2 and one-half.

In the embodiment that is illustrated in the accompanying figures, the conveyor device 1 has an intake conveyor 3 and an outlet conveyor 4, extending in a conveying direction 10. The conveying of the products 2 is done in a conveyor plane 9 that is horizontal within the conveyor device 1. The products 2 are preferably elongated in shape, in particular with a circular or essentially circular base, of the bottle type, or the like. The base of the product 2, circular or otherwise, is normally in the conveyor plane 9. The products 2 can arrive at the intake conveyor 3 arranged in bulk, i.e., arranged in a relatively random way between two longitudinal walls that delimit the flow. In a general way, a wide flow corresponds to products 2 that are organized between two guides that are spaced, perpendicular to the direction of movement of the products 2, with a distance that is greater than the size of a product 2. Such an organization can take the shape of a staggering with products 2 that are in contact with one another, or an arrangement that is spaced in which the products 2 do not touch. The products 2 can thus be in the intake conveyor 3 in a random or compact configuration, in staggered rows, which occurs since the products 4 have a circular base and have a relatively high density or pressure.

The products 2 are thus vertically placed on the intake conveyor 3 and continue their routing in this position through the acceleration conveyor 5 up to the outlet conveyor 4. These three elements, intake conveyor 3, acceleration conveyor 5 and outlet conveyor 4, each take the shape of at least one element of the endless belt or chain type.

The intake conveyor 3 thus optionally has a number of parallel chains or units 12 that are oriented in the conveying direction 10 and that travel at a uniform speed. The outlet conveyor 4 has a decreased number of units 12, since the width of the flow is decreased, in relation to the intake conveyor 3. The outlet conveyor 4 can thus have a single chain that is oriented in the conveying direction 10. It will be understood that the products 2 should be accelerated between, on the one hand, the intake conveyor 3, where they can each circulate at low speed, since they are distributed over a larger width, and, on the other hand, the outlet conveyor 4, where they travel behind one another in a single-file column.

The acceleration conveyor 5 ensures the gradual increase in the speed of products 2 between the intake conveyor 3 and the outlet conveyor 4. The acceleration conveyor 5 has a number of chains or units 12 that are parallel to one another in the conveying direction 10 and whose speed, overall, increases as the chain approaches the outlet conveyor 4. A unit in which the three conveyors together form a number of chains that are parallel to one another in the conveying direction 10, with a speed that increases up to the outlet conveyor 4, is therefore obtained.

Preferably, each chain of the acceleration conveyor 5 has a speed that is different from the chains beside it: the speed of a chain of the acceleration conveyor 5 is greater than that of the chain that is located beside it toward the intake conveyor 3. The increase in speed in the acceleration conveyor 5 is therefore continuous perpendicularly to the conveying direction 10.

The conveyor device 1 is equipped with a guide 6 that extends in particular in the area of the acceleration conveyor 5 in such a way as to form an edge that is downstream from the flow and against which the products 2 are normally brought via the acceleration conveyor 5 itself. This guide 6 therefore extends transversely to the conveying direction 10, from the side of the intake conveyor 3 up to the outlet conveyor 4, opposite, and also in the direction of the flow, from the intake conveyor 3 up to the outlet conveyor 4, downstream. The guide 6 is therefore oblique when it passes through the acceleration conveyor 5 and has the curves that are necessary for preventing overly abrupt changes in direction.

Within the conveyor device 1, the guide 6 extends upstream and downstream, and it is the width of the flow of products from said guide 6 against which it travels that gradually decreases under the action of the acceleration.

The configuration of the guide 6 is preferably such that it has a first part, upstream, and a second part, downstream, with the first deflecting the products 2 toward the outlet conveyor 4 much more quickly than the second. For the same longitudinal path in the conveying orientation and direction 10, the transverse offsetting of the guide 6 is therefore much greater in the first part than in the second. By combining this fast shift that is transverse with a continuous and significant increase of the travel speed of the successive units 12 within the acceleration conveyor 5, it is possible to obtain for the products 2 a relatively significant longitudinal acceleration, which naturally has the effect of quickly reducing the width of the flow of products 2 from the beginning of the acceleration conveyor 5.

During normal operation, the maximum width of the flow of products 2 corresponds to several units of product 2 in the area of the intake conveyor 3, up to a unit in the area of the outlet conveyor 4. The speed differential of the chains of the acceleration conveyor 5 is preferably such that the flow of products 2 has as much as possible, after the first most oblique part of the guide 6 and in the event of an absent counter-guide 7, a width of two products 2. As will be described later, the counter-guide 7 then ensures the shifting from a flow of two front products 2 into a flow of one front product 2. In comparison, the initial flow that has the greatest width is called wide flow.

As the accompanying figure shows, the conveyor device 1 also has a counter-guide 7, which extends essentially into the area of the acceleration conveyor 5. This counter-guide 7 extends opposite the guide 6 and forces, if necessary, the products 2 to be inserted in a single-file column along the guide 6. Thus, the counter-guide 7 assumes the shape of a flexible wall, held between two anchoring points that are separated from one another. Its flexibility makes it possible to be wound slightly around an axis that is perpendicular to the conveyor plane 9, in such a way as to create a curved shape, if necessary, viewed perpendicularly to said plane. This flexibility makes it possible to prevent the products 2 from being subjected to excessive pressure upon the occasion of the acceleration of the flow and the constricting of the flow.

The counter-guide 7 normally extends essentially linearly between its two anchoring points. In certain embodiments, it is parallel to the conveying direction 10. In preferred embodiments, it extends along a path that has a longitudinal component, in the orientation of the conveying direction 10, as well as a transverse component, between the intake conveyor 3 and the outlet conveyor 4. The counter-guide 7 is therefore all the closer to the outlet conveyor 4 as it advances in the conveying direction 10.

The flexibility of the counter-guide 7 makes it possible to exert only a weak force in the direction of the guide 6 at the final end of the convergent portion 8. By this action, a product 2 that would not be against the guide 6, because of products 2 that are between it and said guide 6, is gently pushed toward the guide 6 in such a way as to modify the balance of the positions of the products 2 and to force the creation of a space into which the product 2 can come, and then against the guide 6.

This action of the counter-guide 7 to push the products 2 slightly toward the guide 6 is provided only in the area of the end of a convergent portion 8 that said guide 6 and said counter-guide 7 form together. Actually, the deviation between the guide 6 and the counter-guide 7, forming a channel that is available for the products 2, gradually decreases in the direction of advance of the products 2 up to the end of the convergent portion 8, which then forms the narrowest point in the channel between the guide 6 and the counter-guide 7, or restriction zone 13. The shifting section of the channel that is formed between the guide 6 and the counter-guide 7 therefore gradually decreases up to the end of the convergent portion 8, and then preferably increases again from this restriction 13. Owing to the angle between the conveying direction 10 and the guide 6 in its downstream portion, the distance between the guide 6 and the counter-guide 7 again increases after the restriction zone 13 that forms the end of the convergent portion 8. The fact that the restriction zone 13 is located at a distance from the attachment points of the counter-guide 7 makes it possible for the latter to deform in the area of said restriction zone 13, if necessary, without thereby creating excessive pressure on the products 2, owing to its low mounting tension. In addition, since the thrust work of the counter-guide 7 is done essentially in the area of the restriction zone 7, the risks of wedging points or drops are lower.

The counter-guide 7 is therefore essentially along a linear contour between its two attachment points. In relation to the conveying direction 10, the counter-guide 7 is preferably less oblique than the guide 6 in its first part, which has a strong transverse component in relation to the conveying direction 10.

The opening of the convergent portion 8 is such that the action of the counter-guide 7 is accomplished essentially in the area of the point of said portion 8. The bulk of the reduction of the width of the flow from the intake conveyor 3 is accomplished by the strong initial inclination of the guide 6 and the speed gradient at this location in the acceleration conveyor 5. The channel that is defined between the guide 6 and the counter-guide 7 then acts to reduce the width of the flow more and to bring it to a single-file flow only in the area of the opening or restriction zone 13 of the convergent portion 8. The action of the counter-guide 7 is primarily to disrupt the situations in which a first product 2 forms, with another second product 2 against the guide 6, an alignment that is locally perpendicular to the latter.

The speed gradient in the acceleration conveyor 5 and the orientation of the guide 6 have the effect of the products 2 being arranged quickly in a flow of a maximum width of two products 2. Owing to the curve of the guide 6, the counter-guide 7 can therefore be positioned in such a way as to interact only in the area of two such products 2 side by side, and not in zones where a larger number of front products 2 develops.

The flexibility of the counter-guide 7 and the fact that it works essentially at the end of the convergent portion 8 has the effect that it can deform easily since the flow is too wide in the area of the end of the convergent portion 8, which prevents the wedging points. It therefore is not a matter of forming a rigid convergent portion 8 but of which the width of the channel can be adjusted slightly.

The distance between the guide 6 and the counter-guide 7 therefore changes with the conveying and is initially larger than the width of the flow in the intake conveyor 3, and then decreases in the convergent portion 8 up to its end that forms a restriction zone 13, and then increases again. It is in the area of the restriction zone 13 that the distance between the guide 6 and the counter-guide 7 is the smallest. The restriction zone 13 normally does not make possible the shifting of two products 2 simultaneously, such that if two products 2 arrive side by side, the flexible counter-guide 7 gently pushes toward the guide 6 that of the two that is the farthest away. In the event where two front products 2 arrive, the counter-guide 7 deforms in accordance with its flexibility, which increases its tension and then makes it possible to push the products 2 slightly toward the guide 6. Such a principle resting on the tension of the counter-guide 7 makes it possible in particular to allow two front products 2 to pass in exceptional situations, such as when one of the two is recumbent.

Thus, the position of the counter-guide 7 is such that in the restriction zone 13, which forms the zone of smaller size between the guide 6 and the counter-guide 7, the widest flow that can travel without touching the counter-guide 7 is a column of a single product 2. In other words, in the absence of stress that deforms the counter-guide 7, the former is, in the restriction zone 13 where it is the closet to the guide 7, at a distance from it that is between one and two products 2. The attachment points of the flexible counter-guide 7 are such that the counter-guide 7 is then normally, when closest to the guide 6, at a distance that would make it possible to make it, without making contact with the counter-guide 7, pass one product 2 but not two.

In a general way, this principle can be applied regardless of the number of products 2 that travel together from the front into the outlet conveyor 4: one for the single file, two, three, etc. The counter-guide 7 is positioned in such a way that the restriction zone 13, which forms the passing zone where the counter-guide 7 is closest to the guide 6, makes it possible at most to make travel from the front slightly more than as many products 2 as are on the outlet conveyor 4.

Ideally, the size of the restriction zone 13 for obtaining a single-file flow of products 2 corresponds approximately to the size of one product 2 and one-half. The air gap between the guide 6 and the counter-guide 7 is, in the area of the restriction zone 13, larger than the diameter of a product 2 with a circular base but smaller than twice this diameter. The low tension of the linear counter-guide 7 between its anchoring points that are separated from the restriction zone 13 nevertheless makes it possible for it to deform enough to allow to pass both a product 2 against the guide 6 and a product 2 that has fallen and is recumbent on the acceleration conveyor 5 against the counter-guide 7.

With such an embodiment, a flow in bulk is quickly transformed, in the convergent part 8, upstream from the restriction zone 13, into a flow that has at most two products 2 that are aligned perpendicularly to the guide 6. The shift from a flow with two front products 2 to a flow of a single product 2 is the most difficult part. The flexible counter-guide 9 then intervenes here to ensure that this shift is made as quickly as possible, by coming into contact with the second product 2, the farthest from the guide 6. This then has the effect of offsetting the alignment of the products 2 in relation to the line that is perpendicular to the guide 6, with the units 12 of the acceleration conveyor 5 then ensuring a thrust that makes it possible for the product 2 to be inserted in turn against the guide 6. To complete the alignment, it is then not necessary to provide, in the acceleration conveyor 5, a set of conveyor units whose speeds, one in relation to the other, do not systematically increase as the outlet conveyor 4 is approached.

Thanks to the invention, it thus is possible to obtain an aligner that has a better combination of the following factors: reliability, in terms of drops of products in particular, simplicity of design, length, speed ratio between the intake and the outlet, and flow width ratio between the intake and the outlet.

Although the description above is based on particular embodiments, it is in no way limiting of the scope of the invention, and modifications can be provided, in particular by substituting equivalent techniques or by a different combination of all or part of the characteristics developed above.

The invention claimed is:
1. A conveyor device (1) in a conveyor plane (9) for transforming a wide flow of products (2) into a downstream single-file flow of products, comprising:
   an intake conveyor (3) that is adapted for conveying the wide flow of products (2),
   an outlet conveyor (4) that is adapted for conveying the single-file flow of products,
   an acceleration conveyor (5) that is positioned between the intake conveyor (3) and the outlet conveyor (4) and having a number of conveyor units (12) with a speed gradient,
   a guide (6), for bringing the products (2) transversely from the intake conveyor (3) to the outlet conveyor (4) and positioned downstream from the wide flow of products (2) in such a way that the products (2) are brought against the guide (6) under the action of successive conveyors, and
   a flexible counter-guide (7), arranged essentially opposite the guide (6) in an area of the acceleration conveyor (5) and forming with said guide (6) a convergent guide portion (8) that is oriented toward the outlet conveyor (4),
   wherein a section of the convergent guide portion (8) near the acceleration conveyor (5) forms a restriction zone

(13) sized to prevent two products (2) from entering the restriction zone (13) simultaneously.

2. The conveyor device (1) according to claim 1, where the counter-guide (7) is deformable by winding around an axis that is perpendicular to the conveyor plane (9).

3. The conveyor device (1) according to claim 1, where the intake conveyor (3), the acceleration conveyor (5) and the outlet conveyor (4) are parallel to one another and extend in a conveying direction (10), in the conveyor plane (9), with the orientation of the counter-guide (7) having a component that is transverse to the conveying direction (10) toward the outlet conveyor (4).

4. The conveyor device (1) according to claim 3, wherein the guide (6) passes through the acceleration conveyor (5) with an upstream portion (11) and then a downstream portion (12), with the upstream portion (11) having overall, in relation to the conveying direction (10), a larger angle than the downstream portion (12).

5. The conveyor device (1) according to claim 1, wherein the counter-guide (7) is provided, on its inner contact face, with the products (2), with rollers that are free in rotation to facilitate the travel of the products (2) against it.

6. The conveyor device (1), according to claim 1, further comprising an accumulation table that is mounted upstream from the intake conveyor (3), and the accumulation table comprises an outlet brought directly to the intake conveyor (3).

7. A method for conveying products (2) into a conveyor plane (9) using the conveyor device (1) according to claim 1, comprising the steps of:
   shifting during the products (2) from a wide flow of products on an intake conveyor (3) to a single-file flow of products on an outlet conveyor (4), by passing the products through an acceleration conveyor (5),
   subsequent to said shifting step, moving the products (2) travelling over the acceleration conveyor (5) between a stationary guide (6), downstream, and a flexible counter-guide (7), upstream, wherein the stationary guide (6) and the flexible counter-guide (7) form together a convergent guide portion (8) toward the outlet conveyor (4), and
   utilizing the counter-guide (7), driving toward the guide (6) the products (2) that are removed from said guide (6) by at most by an equivalent of a column of a single front product (2).

8. The method according to claim 7, wherein the acceleration conveyor (5) comprises a number of conveyor units (12) that extend in the conveying direction (10) and are arranged beside one another from the intake conveyor (3) up to the outlet conveyor (4),
   the method further comprising the step of controlling a speed of each of the conveyor units (12) to be higher than a speed of the adjacent conveyor units (12) in the direction of the intake conveyor (3).

9. The method according to claim 7, further comprising forming, from a section of the convergent guide portion (8) near the acceleration conveyor (5), a restriction zone (13) sized to prevent two products (2) from entering the restriction zone (13) simultaneously.

10. The conveyor device (1) according to claim 2, where the intake conveyor (3), the acceleration conveyor (5) and the outlet conveyor (4) are parallel to one another and extend in a conveying direction (10), in the conveyor plane (9), with the orientation of the counter-guide (7) having a component that is transverse to the conveying direction (10) toward the outlet conveyor (4).

11. The conveyor device (1) according to claim 2, where the counter-guide (7) is provided, on an inner contact face, with the products (2), with rollers that are free in rotation to facilitate the travel of the products (2) against the rollers.

12. The conveyor device (1) according to claim 3, where the counter-guide (7) is provided, on an inner contact face, with the products (2), with rollers that are free in rotation to facilitate the travel of the products (2) against the rollers.

13. The conveyor device (1) according to claim 4, where the counter-guide (7) is provided, on an inner contact face, with the products (2), with rollers that are free in rotation to facilitate the travel of the products (2) against the rollers.

14. The method according to claim 7, wherein the acceleration conveyor (5) comprises a number of conveyor units (12) that extend in the conveying direction (10) and are arranged beside one another from the intake conveyor (3) up to the outlet conveyor (4),
   the method comprising the further step of controlling a speed of each of the conveyor units (12) to be higher than a speed of the adjacent conveyer units (12) in the direction of the intake conveyor (3).

15. The method according to claim 8, further comprising the step of forming, from a section of the convergent guide portion (8) near the acceleration conveyor (5), a restriction zone (13) sized to prevent two products (2) from entering the restriction zone (13) simultaneously.

16. The conveyor device (1) according to claim 10, wherein the guide (6) passes through the acceleration conveyor (5) with an upstream portion (11) and then a downstream portion (12), with the upstream portion (11) having overall, in relation to the conveying direction (10), a larger angle than the downstream portion (12).

17. The conveyor device (1) according to claim 10, where the counter-guide (7) is provided, on an inner contact face, with the products (2), with rollers that are free in rotation to facilitate the travel of the products (2) against the rollers.

18. The conveyor device (1) according to claim 16, where the counter-guide (7) is provided, on an inner contact face, with the products (2), with rollers that are free in rotation to facilitate the travel of the products (2) against the rollers.

* * * * *